United States Patent [19]

Roberts

[11] Patent Number: 4,640,307

[45] Date of Patent: Feb. 3, 1987

[54] FLOAT VALVE

[75] Inventor: Charles G. Roberts, Richmond, England

[73] Assignee: Roberts & Associates Water and Waste Treatment Limited, England

[21] Appl. No.: 555,690

[22] Filed: Nov. 28, 1983

[30] Foreign Application Priority Data

Nov. 30, 1983 [GB] United Kingdom ............... 8234090

[51] Int. Cl.³ ................... F16K 31/22; F16K 33/00
[52] U.S. Cl. ................... 137/448; 137/426; 137/433; 137/443
[58] Field of Search ............ 137/426, 434, 443, 448, 137/451, 430, 433, 428, 429, 312, 399

[56] References Cited

U.S. PATENT DOCUMENTS

| 717,450 | 12/1902 | Prowant | 137/448 |
|---|---|---|---|
| 1,113,648 | 10/1914 | Karlson | 137/448 |
| 1,600,670 | 9/1926 | Hess | 137/448 |
| 1,732,222 | 10/1929 | Cantrall | 137/399 |
| 2,499,409 | 3/1950 | Norway | 137/448 |
| 2,507,545 | 5/1950 | Samiran | 137/429 |
| 2,756,769 | 7/1956 | Martin et al. | 137/443 |
| 3,139,897 | 7/1964 | Morgan et al. | 73/317 |
| 3,158,173 | 11/1964 | Bachli et al. | 137/443 |
| 3,331,387 | 7/1967 | Walters | 137/426 |
| 3,342,207 | 9/1967 | Ross | 137/448 |
| 3,511,265 | 5/1970 | Martin | 137/434 |
| 3,837,015 | 9/1974 | Whitaker | 4/508 |
| 4,026,515 | 5/1977 | Grove | 137/312 |
| 4,335,741 | 6/1982 | Nasser | 137/426 |

FOREIGN PATENT DOCUMENTS

| 438846 | 8/1948 | Italy | 137/448 |
|---|---|---|---|
| 335346 | 5/1972 | U.S.S.R. | |
| 160949 | 1/1920 | United Kingdom . | |
| 373476 | 7/1931 | United Kingdom . | |
| 523299 | 12/1938 | United Kingdom . | |

Primary Examiner—George L. Walton
Attorney, Agent, or Firm—Barnes & Thornburg

[57] ABSTRACT

A float valve mechanism for a cistern or tank comprising a housing (20,22) defining a closed chamber (24) having an inlet port (26) connected to an inlet pipe (16) to the cistern or tank, an outlet port (28) from the chamber having a valve seat (30) surrounding the port. A valve member (34) passes through the opening and has a valve head located within the chamber, the valve head being integrally formed, preferably from a plastic material, with a lever (38) which is pivotal about axis (42) and carries a float (54). The valve head (36) is pivotally movable an integral manner with the lever along a path passing through the outlet port (28) of the chamber. Water pressure within the chamber normally urges the valve to the closed position and the weight of the float when the water has fallen below a given level in the tank overcomes this pressure to allow water to flow from the chamber into the cistern.

9 Claims, 4 Drawing Figures

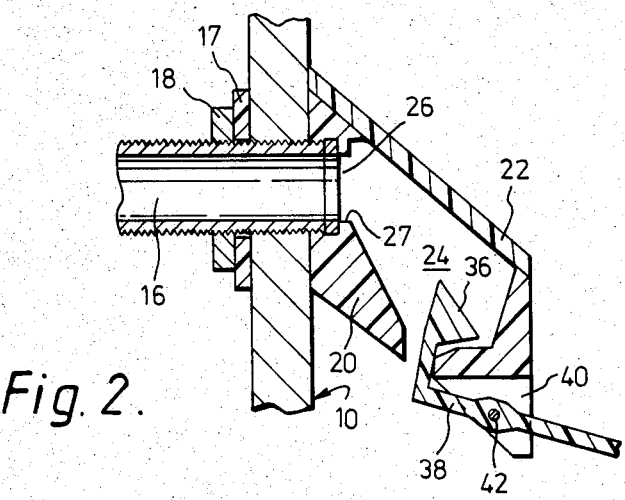
Fig. 2.
Fig. 3.
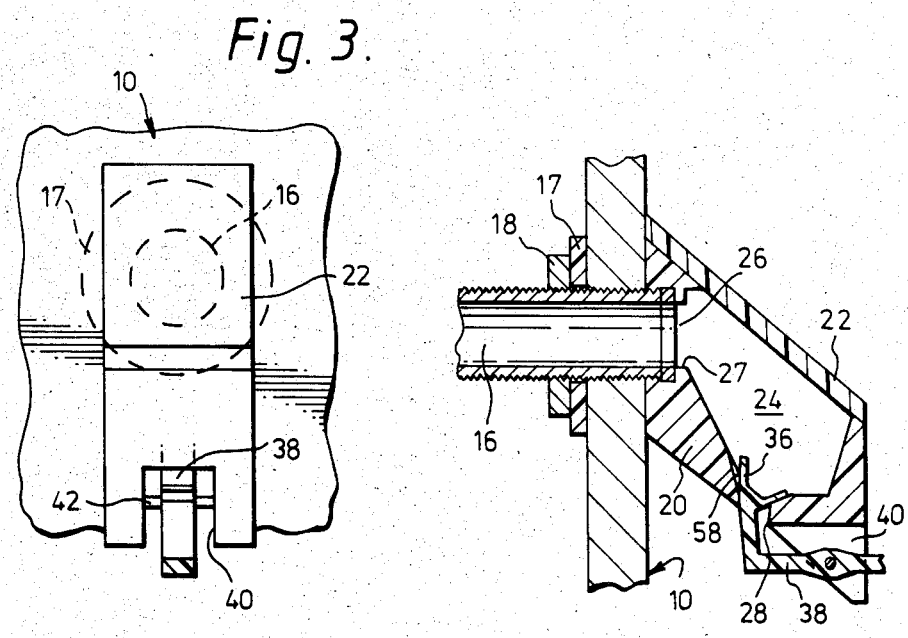
Fig. 4.

FLOAT VALVE

DESCRIPTION

The present invention relates to float valves which may, for example, be used domestically in water tanks, W.C. cisterns or the like and may be used industrially in a number of situations in which a liquid fills a tank.

The conventional type of ball valve which is used in the majority of domestic situations in Great Britain involves a cylindral housing with a longitudinally removable solid cylinder which is urged longitudinally by the short arm of a pivotal lever the long arm of which carries a ball. The valve piston includes a resilient washer which is urged against a tubular valve seat through which the water enters. Such a structure is inherently rather complicated, relies on the upthrust of the ball to give the full valve closing force and is liable to jamming.

Further improvements have been suggested, for example, in British Pat. Nos. 160049; 373476 and 523299 in which a closed chamber is defined by the valve housing and has an inlet port adapted to be connected to an inlet pipe to the cistern, an outlet port from the chamber having a valve seat surrounding the port. The valve member passes through the outlet port and has a valve head located within the chamber. A pivotally mounted lever having a float at one end has means connecting the other end of the lever to the valve member to raise the head from the seat when the water level falls below a certain value, to allow water to flow from the chamber via the outlet.

The constructions described in the above patents utilise the fluid pressure to assist in closing the valve but are very complicated and therefore expensive and are themselves liable to jamming.

It is now proposed, according to the present invention, to provide a float valve mechanism comprising a valve housing defining a closed chamber and an inlet port adapted to be connected to an inlet pipe, an outlet port from the chamber having a valve seat surrounding the port, a valve member passing through the outlet port and having a valve head located within the chamber and a pivotally mounted lever having a float at one end and means connecting the lever to the valve member to raise the head from the seat when the water in the cistern or tank to which the valve is attached falls below a certain level, to allow water to flow from the chamber via the outlet, the valve member being connected directly to the lever, so as to pivot integrally therewith along a path passing through said outlet port.

Such a structure can be made very cheaply and simply and yet is very effective insofar as it again utilises water pressure within the chamber to provide the closing force on the valve member. The only movement is the pivotal movement and there is no necessity, as in the prior constructions, for there to be any sliding movement at all.

Preferably the valve head is formed actually integrally with the lever which may, for example, be formed of a plastic material.

In a preferred construction the valve seat and the valve head are of cooperating conical shape and the valve head is made hollow so that its interior is subject to fluid pressure in said closed chamber, thereby to urge the valve head more firmly against the valve seat.

Advantageously the closed chamber is inclined obliquely downwardly from the inlet port, the outlet port axis being inclined downwardly towards the adjacent wall of the cistern or tank to which the valve is fitted and the valve head is also inclined in a cooperating manner therewith, whereby fluid flowing into the inlet port is caused to flow against the adjacent side of a valve head to maintain the valve firmly in the open position until the float pivots the lever to a position nearly closing the valve, whereupon fluid pressure within the chamber urges the valve head against the seat. Water pressure thus is used firstly to hold the valve open as the water flows into the chamber and secondly to hold the valve closed when the valve has moved to its closed position under the action of the float.

The housing may be formed in two parts including a generally channel shaped member, having the outlet port formed in the web of the channel and a cover sealingly closing the space between the free ends of the arms of the channel, the cover, when removed and during assembly of the valve, allowing the end of the lever remote from the valve member to pass through the chamber and then through the outlet port until the valve member is located within the chamber adjacent to the outlet port. This facilitates the assembly of the valve which has the relatively large cross-section head mounted integrally on the lever which must, therefore, be passed through the outlet port from the inside of the chamber. An alternative construction could involve the use of a screw top to the chamber.

The housing may be provided with a bleed passage which connects a portion of the valve seat, when the valve is closed, to the interior of the chamber. The advantage of this is to reduce there being any possibility of water hammer.

The force required to close the valve under the upthrust of the float is really very small because it is the water pressure which actually causes the closing. However, the force required to open the valve is quite considerable and it is advantageous, therefore, for the float to be relatively heavy. It may therefore be in the form of a container which can be partly filled to provide a desired weight of the float to facilitate opening of the valve. To account for different pressures of water means may be provided to allow the position of the float along the lever to be adjusted and to provide the necessary adjustment of the level at which the valve shuts off the flow of liquid, means may be provided to allow the vertical position of the float to be adjusted relative to the lever for example in the form of a screw connection.

In order that the present invention may more readily be understood, the following description is given, merely by way of example, reference being made to the accompanying drawings in which;

FIG. 2 is a view similar to a portion of FIG. 1 with the valve in the open position;

FIG. 3 is an end view of the valve of FIGS. 1 and 2; and

FIG. 4 is a view similar to a portion of FIG. 1 showing a modified construction.

Figure 1:
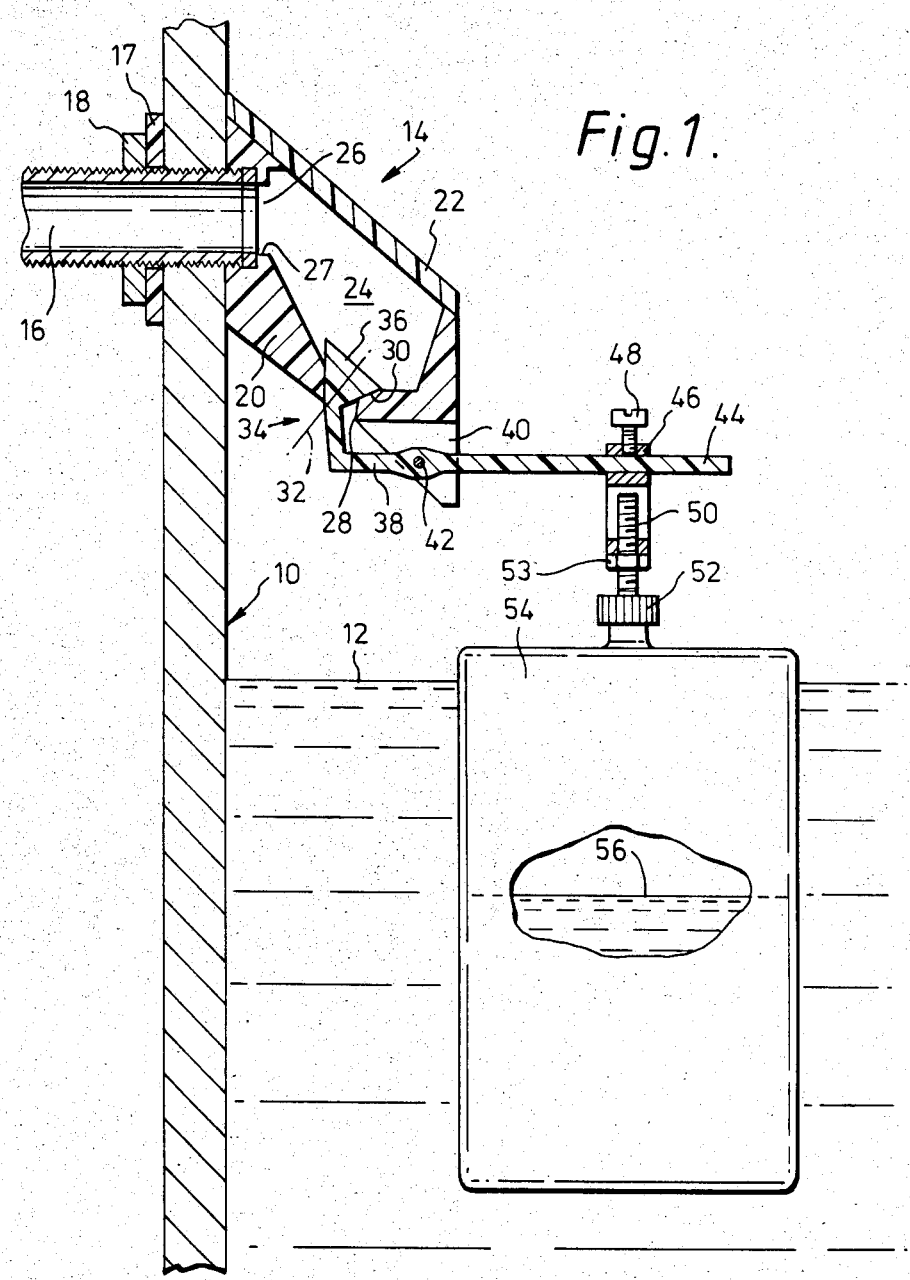
FIG. 1 is a cross-section through one embodiment of valve according to the invention shown positioned in the side wall of a tank, with the valve in the closed position.

Referring first to FIG. 1 there is illustrated a tank 10 filled with water to a level 12 and having mounted, on the inner surface of the wall 10 above the water, a valve 14 according to the present invention. The valve is mounted on a threaded inlet pipe 16 provided with a sealing washer 17 and a locking nut 18. The inlet pipe 16 can be connected to a source of water (not shown).

Threaded onto the interior end of the pipe 16 is the body 20 of the housing of the valve. This body is formed from a plastic material and is of generally channel cross-section and is provided with a cover 22. It will be noted that the cover 22 and the lower surface of the body 20 are inclined downwardly away from the inner end of the pipe 16. The body 20 and cover 22 define a closed chamber 24 having an inlet port 26 which includes the internal screw thread 27 for connection to the inlet pipe 16. The housing is also provided with an outlet opening 28 having a conical valve seat 30 surrounding the opening. The axis 32 of the conical valve seat is inclined downwardly and towards the tank wall 10.

A valve member indicated by the general reference numeral 34 is again formed of plastics material and includes a conical valve head 36 which is formed integrally with a lever 38 from a plastics material. It shall be seen that the lower part of the body 20 is provided with a downwardly opening groove 40 defined by two horizontally spaced, generally vertically extending flanks. Extending between these flanks is a pivot pin 42 upon which the lever 38 is pivotally mounted.

The lever 38 has an arm 44 extending to the right of the pivot 42 and slidable onto this arm 44 is a clamp 46 the position of which can be adjusted and thereafter fixed by a clamping screw 48. Vertically threaded into the clamp 46 is a rod 50 carried by a cap 52 of a bottle 54 forming a float which is filled to a particular level, indicated at 56, for example with water.

The chamber 24, as indicated, is fully closed to atmosphere and is subject to pressure from the water or other liquid flowing into the inlet port 26. The water pressure acting on the valve head 36 will maintain the valve in the closed position of FIG. 1 even when the water level 12 falls somewhat. However, when the water level falls beyond a certain value, the weight of the float 54, with water in it, will be sufficient to pivot the lever 38 to the position illustrated in FIG. 2. The inflow of water against the left-hand side of valve head 36 will maintain the pivotal arrangement of FIG. 2 until the tank is nearly full and the upthrust from the float is sufficient to overcome this force. Thereupon the lever will pivot to the position of FIG. 1 and it will snap into this position rapidly and thence shut off the flow. The level of the water at which the valve shuts off can be altered by screwing the rod 50 higher or lower into the clamp 46. The rod can be secured in the selected position by tightening the lock nut 53.

FIG. 3 illustrates a modified arrangement in which a bleed passage 58 is provided adjacent the valve to allow some of the pressure within the chamber 24 to bear upwardly against a small portion of the conical surface of the valve thereby reducing any tendency for water hammer when the valve closes. One can adjust the position of the clamp 46 to suit any particular water pressure and one can adjust the vertical position of the rod 50 to give a desired level. The valve tank shown here is again generally conical and is shown as being hollow so that the water pressure urges the valve head more firmly into the seat.

The inclined outflow from the inlet port along the axis 32 will project water against the wall of the tank and thereby reduce the noise of discharge of water from the chamber. Additionally a shroud may be added which is clamped between the wall of the tank and the body 20 of the housing and which has walls extending below the body, to reduce the noise of the discharging water still further.

I claim:

1. A float valve mechanism for a cistern or tank, said valve mechanism comprising, in combination:
   (a) a plastics material valve housing defining a closed chamber;
   (b) an inlet port to said closed chamber adapted to be connected permanently to the inlet pipe to said cistern or tank;
   (c) an outlet port from said chamber;
   (d) a conical valve seat surrounding said outlet port said valve seat having a cone axis;
   (e) a plastics material lever pivotally mounted on said housing for pivotal movement about a horizontal axis;
   (f) a hollow float which can be partly filled to render it relatively heavy and is rigidly affixed to the lever at a location laterally spaced from said axis and so as to extend below the lever so as to be freely movable with the lever in the cistern or tank effective to cause the lever to pivot about said horizontal axis as the level of water in said cistern of tank rises and falls;
   (g) a plastics material valve member fixedly connected directly and rigidly to said lever and passing freely through said outlet port; and
   (h) a plastics material valve head on said valve member located within said chamber, with a cooperating conical surface on said valve head, sealingly engageable in said conical valve seat in a closed position of said valve, the valve head then having a portion fully within said closed valve chamber, said valve head pivoting as an integral unit with said lever, said valve head being positioned on said lever whereby said valve head moves along a circular path centered on the pivot of the lever and passing through said outlet port, the cone axis of the valve head and valve seat being tangent at all times to said circular path, whereby the conical surface on said valve head sealingly engages the conical valve seat around its full periphery, in said closed position to seal off flow from said closed chamber through said outlet port, inlet water pressure acting on said portion of said valve head fully within said closed valve chamber, to maintain the valve head continuously closed until the pivoting moment of the weight of said partly filled float is sufficiently great to overcome the pivoting moment of the water pressure in said closed chamber acting on said valve head.

2. A float valve as claimed in claim 1, wherein the valve head is formed integrally with the lever.

3. A float valve according to claim 1, wherein said valve head is made hollow so that its interior is subject to fluid pressure in said closed chamber, thereby to urge the valve head more firmly against the valve seat.

4. A float valve according to claim 1, wherein the closed chamber is inclined obliquely downwardly from the inlet port, the outlet port axis being inclined downwardly towards the adjacent wall of the cistern and the valve head also being inclined in a cooperating manner therewith, whereby fluid flowing in through the inlet port is caused to flow against the adjacent side of the valve head to maintain the valve firmly in the open position until the float pivots the lever to a position nearly closing the valve, whereupon fluid pressure within the chamber urges the valve head against the seat.

5. A float valve according to claim 1, wherein the housing is formed in two parts including a generally channel shaped member, having the outlet port formed in the web of the channel and a cover sealingly closing the space between the free ends of the arms of the channel, the cover, when removed and during assembly of the valve, allowing the end of the lever remote from the valve member to be passed through the chamber and then through the outlet port, until the valve member is located within the chamber adjacent to the outlet port.

6. A float valve according to claim 1 wherein the housing further comprises a bled passage connecting a portion of the valve seat, when the valve is closed, to the interior of the chamber.

7. A float valve mechansim for a cistern or tank, said valve mechanism comprising, in combination:
(a) a plastics material valve housing defining a closed chamber;
(b) an inlet port to said closed chamber adapted to be connected permanently to the inlet pipe to said cistern or tank;
(c) an outlet port from said chamber;
(d) a conical valve seat surrounding said outlet port said valve seat having a cone axis;
(e) a plastics material lever pivotally mounted on said housing for pivotal movement about a horizontal axis;
(f) a float rigidly affixed to the lever at a location laterally spaced from said housing, and so as to extend below the lever effective to cause the lever to pivot about said horizontal axis as the level of water in said cistern or tank rises and falls;
(g) a plastics material valve member fixedly connected directly and rigidly to said lever and passing freely through said outlet port; and
(h) a plastics material valve head on said valve member, said valve head being located within said chamber and of a cooperating conical shape to said conical valve seat, so as to be sealingly engageable in said conical valve seat in a closed position of said valve, the valve head then having a portion fully within said closed valve member, said valve head pivoting as an integral unit with said lever, said valve head being positioned on said lever whereby said valve head moves along a circular path centered on the point of the lever and passing through said outlet port, the cone axis of the valve head and valve seat being tangent at all times to said circular path, whereby the conical surface on said valve head sealingly engages the conical valve seat around its full periphery effective, in said closed position to seal off flow of water from said chamber through said outlet port, when the water level in said cistern or tank is below the inlet port to said closed chamber, inlet water pressure in said closed chamber acting on said portion of the valve head fully within said chamber continuously to hold it in sealing engagement with said valve seat.

8. A float valve as claimed in claim 7, wherein said float is in the form of a container which can be filled by varying amounts to provide the desired weight whereby the inlet water pressure acting on a surface of the valve head within said chamber is sufficient to maintain the valve shut, until the pivoting movement of the weight of said partly filled float is sufficiently great to overcome the pivoting moment of the water pressure in said closed chamber acting on said valve head 9. A float valve mechanism for a cistern or tank, said valve mechanism comprising in combination:
(a) a valve housing defining an enclosed chamber;
(b) an inlet port to said closed chamber adapted to be permanently connected to the inlet pipe to said cistern or tank;
(c) an outlet port from the chamber;
(d) a conical valve seat surrounding said outlet port said valve seat having a cone axis;
(e) a lever pivotally mounted on said housing for pivotal movement about a horizontal axis;
(f) a weighted float rigidly affixed to the lever at a location laterally spaced from said housing, and so as to extend below said lever, effective to cause the lever to pivot about said horizontal axis as the level of water or other liquid in said cistern or tank rises and falls;
(g) a valve member fixedly connected directly and rigidly to said lever and passing freely through said outlet port; and
(h) a valve head on said valve member, said valve head being within said chamber and having a surface of cooperating conical shape to said conical valve seat, said valve head being positioned on said lever so as to be sealingly engageable around the full periphery of said valve head in said conical valve seat precisely at the moment when said valve head reaches a closed position of said valve, the valve head then having a portion fully within said closed valve chamber, said valve head pivoting as an integral unit with said lever, whereby said valve head moves along a circular path centered on the pivot of the lever and passing through said outlet port, the cone axis of the valve head and valve seat being tangent at all times to said circular path, whereby the conical surface on said valve head is effective, in said closed position to seal off water or other liquid flow from said chamber through said outlet port, the inlet pressure of said water or other liquid within said chamber acting on said portion of said valve head fully within said closed chamber to maintain the concial valve surface continuously in sealing contact with said conical valve seat until the turning moment of said weighted float about said horizontal axis exceeds the turning moment of the inlet pressure acting on said portion of said valve head.

* * * * *